(12) United States Patent
Meng

(10) Patent No.: US 7,500,239 B2
(45) Date of Patent: Mar. 3, 2009

(54) PACKET PROCESSING SYSTEM

(75) Inventor: David Qiang Meng, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 1069 days.

(21) Appl. No.: 10/444,866

(22) Filed: May 23, 2003

(65) Prior Publication Data
US 2004/0237085 A1 Nov. 25, 2004

(51) Int. Cl.
G06F 9/46 (2006.01)
G06F 12/00 (2006.01)
G06F 15/00 (2006.01)
G06F 15/16 (2006.01)

(52) U.S. Cl. .................. 718/100; 718/102; 711/162; 712/18; 709/232

(58) Field of Classification Search ......... 718/100–108; 709/230, 226, 232; 710/100; 711/108, 162; 712/18; 370/382–420
See application file for complete search history.

(56) References Cited

U.S. PATENT DOCUMENTS

| | | | | |
|---|---|---|---|---|
| 6,625,654 B1* | 9/2003 | Wolrich et al. | | 709/230 |
| 6,661,794 B1* | 12/2003 | Wolrich et al. | | 370/394 |
| 6,836,808 B2* | 12/2004 | Bunce et al. | | 710/20 |
| 6,868,476 B2* | 3/2005 | Rosenbluth et al. | | 711/108 |
| 6,931,641 B1* | 8/2005 | Davis et al. | | 718/108 |
| 6,934,780 B2* | 8/2005 | Modelski et al. | | 710/100 |
| 6,947,425 B1* | 9/2005 | Hooper et al. | | 370/394 |
| 7,181,742 B2* | 2/2007 | Hooper | | 718/100 |
| 2002/0083297 A1* | 6/2002 | Modelski et al. | | 712/18 |
| 2003/0041163 A1* | 2/2003 | Rhoades et al. | | 709/232 |
| 2003/0069920 A1* | 4/2003 | Melvin et al. | | 709/108 |
| 2003/0182525 A1* | 9/2003 | O'Connell et al. | | 711/162 |
| 2004/0028044 A1* | 2/2004 | Hooper | | 370/392 |
| 2004/0071152 A1* | 4/2004 | Wolrich et al. | | 370/420 |
| 2004/0098496 A1* | 5/2004 | Wolrich et al. | | 709/230 |
| 2004/0098720 A1* | 5/2004 | Hooper | | 718/102 |
| 2004/0252686 A1* | 12/2004 | Hooper et al. | | 370/389 |

OTHER PUBLICATIONS

Intel, "Intel IXP1200 Network Processor Family", Hardware Reference Manual, Aug. 2001, pp. 17-49.*

(Continued)

Primary Examiner—Meng-Ai An
Assistant Examiner—Jennifer N To
(74) Attorney, Agent, or Firm—Buckley, Maschoff & Talwalkar LLC

(57) ABSTRACT

According to some embodiments, each of a plurality of threads receives a start signal from a previous thread and a data packet from a buffer. Each thread issues a command to store the data packet in a memory, receives a continue signal from the previous thread, transmits a continue signal to a next thread after the data packet is stored in the memory, disposes of the data packet, receives an indication that the buffer has received a new packet, receives a start signal from the previous thread, and transmits a start signal to a next thread.

25 Claims, 14 Drawing Sheets

OTHER PUBLICATIONS

Intel, "IXP1200 Network Processor" Application Note, Sep. 2001, pp. 5-24.*

Bay Microsystem, "Memory Subsystem: A Question of Cost vs. Speed", Apr. 2002, pp. 1-6.*

Johnson et. al, "IXP1200 Programming, the Microengine Coding Guide for the Intel Network Processor Family", pp. 1-97.*

Nichols, Bradford et al. "Pthreads Programming" O'Reilly & Associates, Inc, Sep. 1996. pp. 29-53,93-107.*

Adiletta, Matthew et al., "The Next Generation of Intel IXP Network Processors", Intel Technology Journal, vol. 6, Issue 3 (2002); © Intel Corporation. p. 6-18.

Adiletta, Matthew et al., "Packet over SONET: Achieving 10 Gigabit/sec Packet Processing with an IXP2800", Intel Technology Journal, vol. 6, Issue 3 (2002); © Intel Corporation. p. 29-39.

Shah, Niraj et al., "NP-Click: A Programming Model for the Intel IXP1200", 2nd *Workshop on Network Processors (NP-2)*, 9th *International Symposium on High Performance Computer Architectures (HPCA)* Feb. 2003.

* cited by examiner

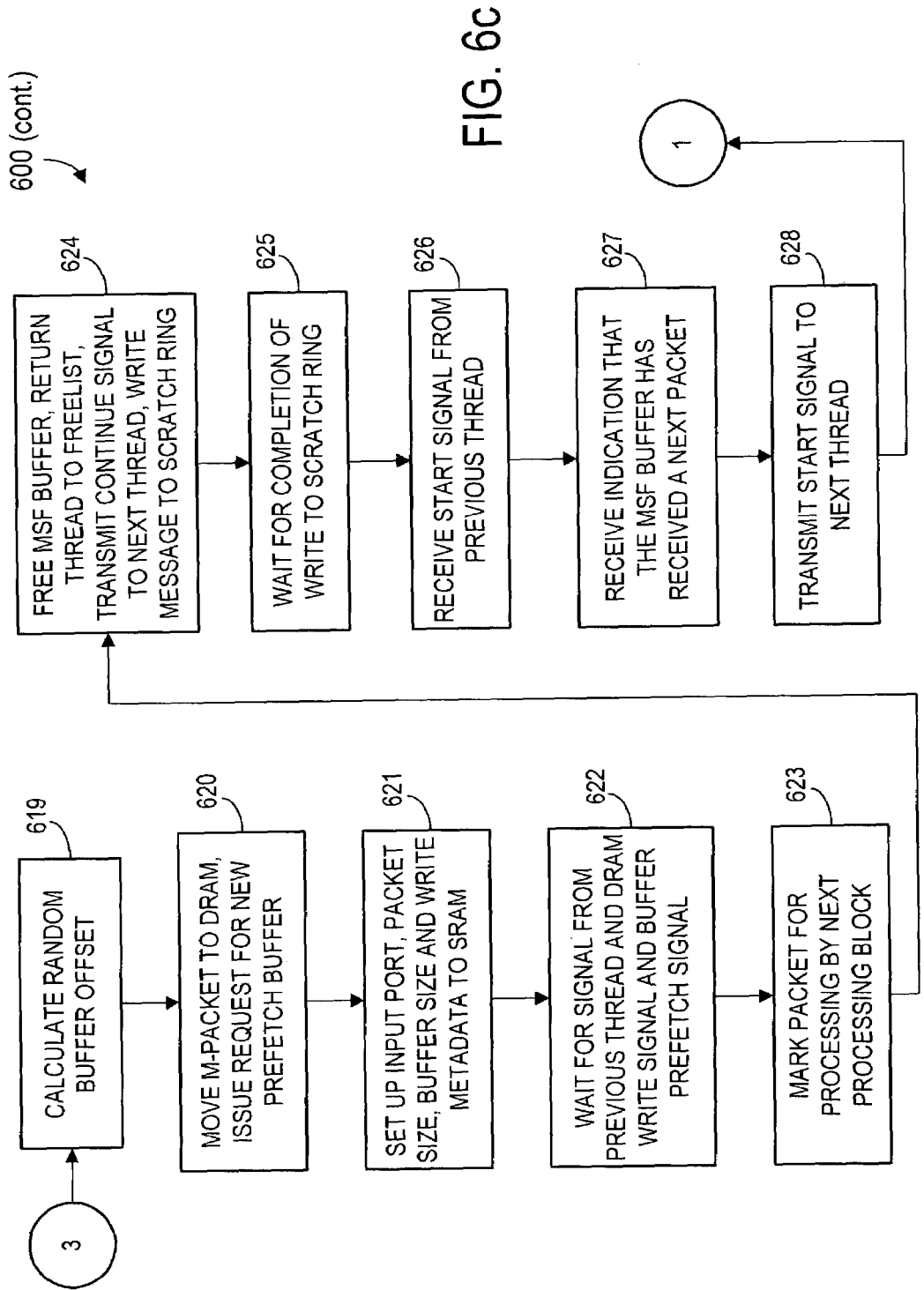

PACKET PROCESSING SYSTEM

BACKGROUND

Conventional communication networks allow network devices to exchange data with one another. For example, one personal computer connected to a network may transmit data to another personal computer that is also connected to the network. Some networks transmit data in the form of network packets. A packet may include not only data to be transmitted, but also information usable to route the packet, to check the packet for errors, and to reassemble a message of which the packet is a part.

Packets are therefore subjected to various processing as they travel through a network. The time required to process packets may limit the speed at which packets can be exchanged between network devices. As networks continue to physically support greater and greater data transmission speeds, efficient packet processing systems are increasingly desirable.

BRIEF DESCRIPTION OF THE DRAWINGS

FIGS. 6a through 6h comprise a detailed flow diagram of a process according to some embodiments.

DETAILED DESCRIPTION

Figure 1:
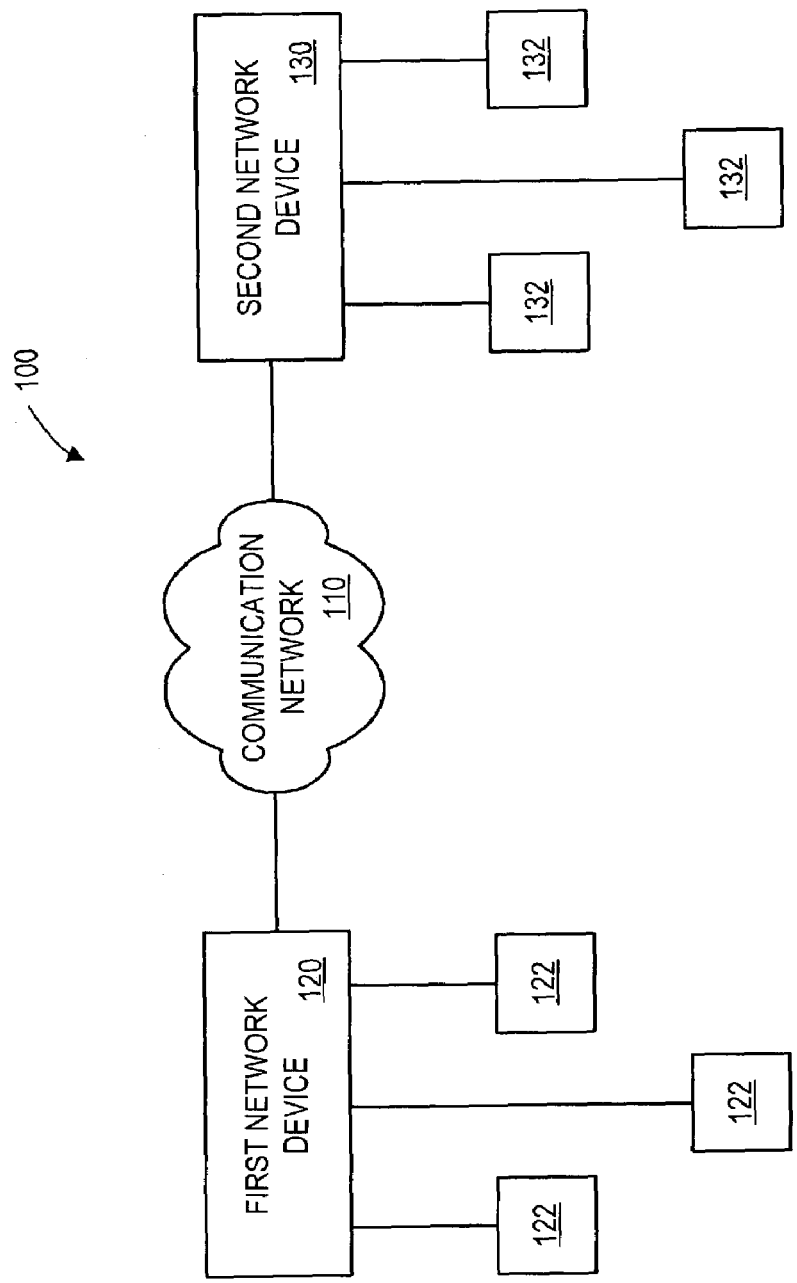
FIG. 1 is a block diagram of a network according to some embodiments.

FIG. 1 is a block diagram of communication system 100. Communication system 100 includes communication network 110, which is in communication with first network device 120 and second network device 130. In particular, first network device 120 may exchange information with second network device 130 via communication network 110. Network devices 120 and 130 may comprise, for example, network switches or routers, such a device incorporating one or more 1XP2400 network processors available from Intel®. A network switch or router may receive streams of data from other network devices, such as personal computers and handheld devices, process the data, and forward the data to appropriate other network devices, including other network switches or routers. The data may be received and forwarded by several network devices until they reach an appropriate destination.

Communication network 110 may comprise one or more network types, including but not limited to a Local Area Network (LAN), a Metropolitan Area Network (MAN), a Wide Area Network (WAN), a Fast Ethernet network, a wireless network, a fiber network, and/or an Internet Protocol (IP) network, such as the Internet, an intranet, or an extranet. Communication network 110 may support Layer 2 protocols, such as Ethernet or Packet-Over SONET, in which data is transmitted in packet form. Moreover, communication network 110 may comprise one or more of any readable medium for transferring data, including coaxial cable, twisted-pair wires, fiber-optics, RF, infrared and the like. Communication network 110 may include any number of unshown network devices (e.g., intermediate switches and routers).

As illustrated in FIG. 1, first network device 120 may communicate with a number of associated network devices 122. Each of network devices 122 may comprise any device for communicating via network packets, including a personal computer, a personal digital assistant, a cellular telephone, or the like. Similarly, second network device 130 may communicate with a number of associated devices 132. One of devices 122 may thereby transmit a stream of network packets to one of devices 132. The network packets may be encapsulated and transmitted according to any network protocol according to some embodiments.

Figure 2:
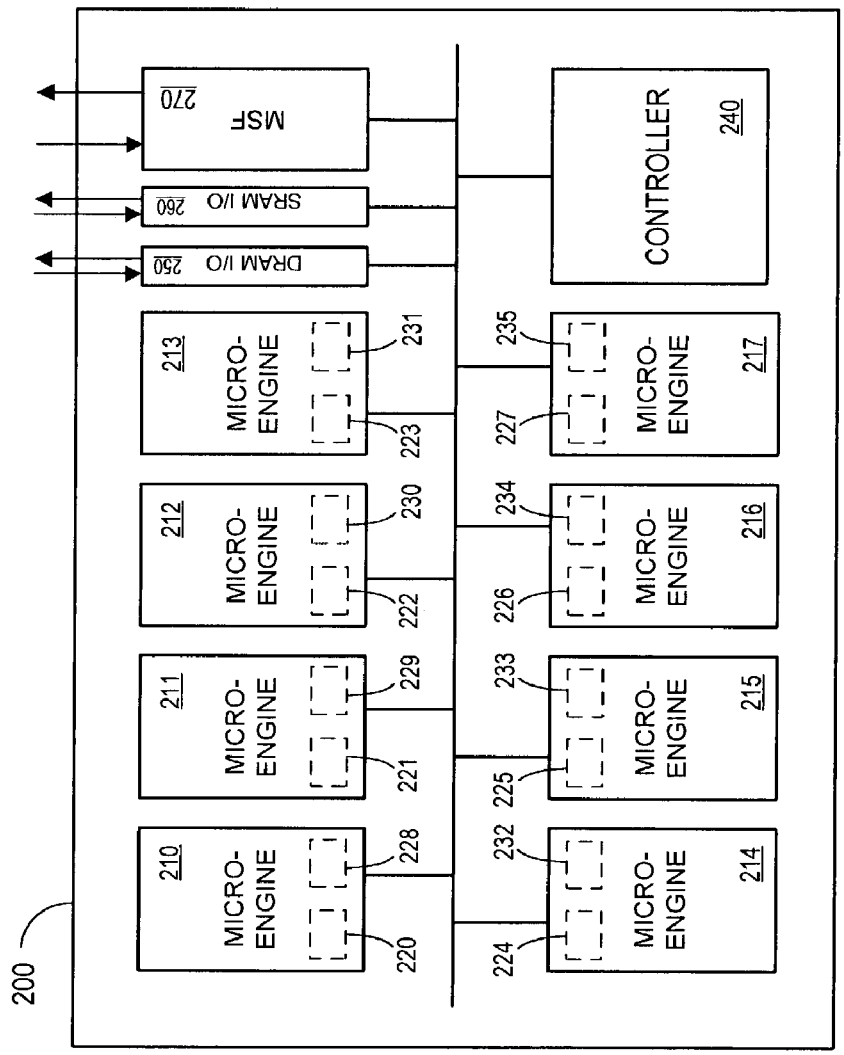
FIG. 2 is a block diagram of a network processor according to some embodiments.

FIG. 2 is a block diagram of network processor 200 that may be used in conjunction with some embodiments. Network processor 200 may comprise the aforementioned 1XP2400 Network Processor and may therefore be an element of network device 120. Other network processors, such as an 1XP2800™ Network Processor, may be used in some embodiments.

Network processor 200 includes microengines 210 through 217, each of which is associated with a respective one of local memories 220 through 227. Each of microengines 210 through 217 comprises a multi-threaded Reduced Instruction Set Computing (RISC) processor for processing network packets independently from one another. According to some embodiments, each of microengines 210 through 217 supports up to eight threads of execution. The above-mentioned 1XP2800 Network Processor may comprise sixteen microengines.

Microengines 210 through 217 also comprise a respective one of control stores 220 through 227. Stores 220 through 227 may store microcode including function calls that are executable by a respective microengine. A group of function calls used to perform particular packet processing is a microblock. The packet processing may include any type of processing, such as packet receiving, IPv6 forwarding, MPLS forwarding, and packet classification.

Each of microengines 210 through 217 contains a respective one of local memories 228 through 235. Local memories 228 through 235 each comprise 4 Kb of memory for storing 640 long words (32 bits) of data. Local memories 228 through 235 are privately-addressable by their respective microengine and may be used by threads for temporary storage during execution of a microblock. Each of microengines 210 through 217 may include additional storage, such as general-purpose and transfer registers.

Network processor 200 also includes Controller 240. Controller 240 may comprise, for example, a control plane processor (e.g., an Intel® XScale™ processor) that performs control and system management functions and executes real-time applications. DRAM I/O 250 receives and transmits information including network packets from and to a remote DRAM, and SRAM I/O 260 performs similar functions with respect to a remote SRAM.

Media and Switch Fabric (MSF) 270 couples processor 200 to a network physical (PHY) layer and/or a switch fabric. MSF 270 includes independent receive and transmit interfaces, as well as a receive buffer. The receive buffer stores incoming packets in buffer sub-blocks known as elements. The receive buffer may store 8 KB of data, and the element size may be set to one of 64 B, 128 B or 256 B.

In operation, MSF 270 may break down a received network packet into multiple m-packets of the set element size, with each m-packet being stored as a segment within an element of the receive buffer. A Receive Status Word (RSW) register of MSF 270 may include data bits that designate whether the m-packet represents a beginning, middle or end of the received network packet. These designations will be referred to herein as Start of Packet (SOP), Middle of Packet (MOP), and End of Packet (EOP). Some m-packets may be designated SOP/EOP because they represent an entire received network packet.

A thread may receive an indication from MSF 270 that the receive buffer has received a new m-packet. Threads of each microengine may read an element of the receive buffer. In this regard, each thread of a microengine may be associated with its own register set, program counter and thread-specific local registers within the microengine. Such an arrangement may allow a thread of microengine to execute a computation while another thread of the microengine waits for an I/O procedure (e.g. external memory access) to complete or for a signal from another thread or hardware element.

Each thread may be in one of four states: inactive, executing, ready, or sleep. A thread is inactive if it is not to be used by a particular microblock executed by its microengine. An executing thread is in control of its microengine, and the program counter of an executing thread fetches program code to be executed. A thread remains in the executing state until it executes code that causes it to enter the sleep state. According to some embodiments, only one thread of a microengine may be in the executing state at a given time.

In the ready state, a thread is ready to execute code but is not because another thread is in the executing state. When the executing thread enters the sleep state, a microengine arbiter selects a next thread to enter the executing state from all threads in the ready state. A thread in the sleep state is waiting for an external event to occur. As mentioned above, this event may include completion of an I/O procedure and a signal from a hardware element or another thread.

Network processor 200 may include elements other than those illustrated in FIG. 2. For example, network processor 200 may include elements for communicating with a host processor over a standard PCI interface. Network processor 200 may also or alternatively include a scratchpad memory for quickly passing data between microengines and/or threads.

Figure 3:
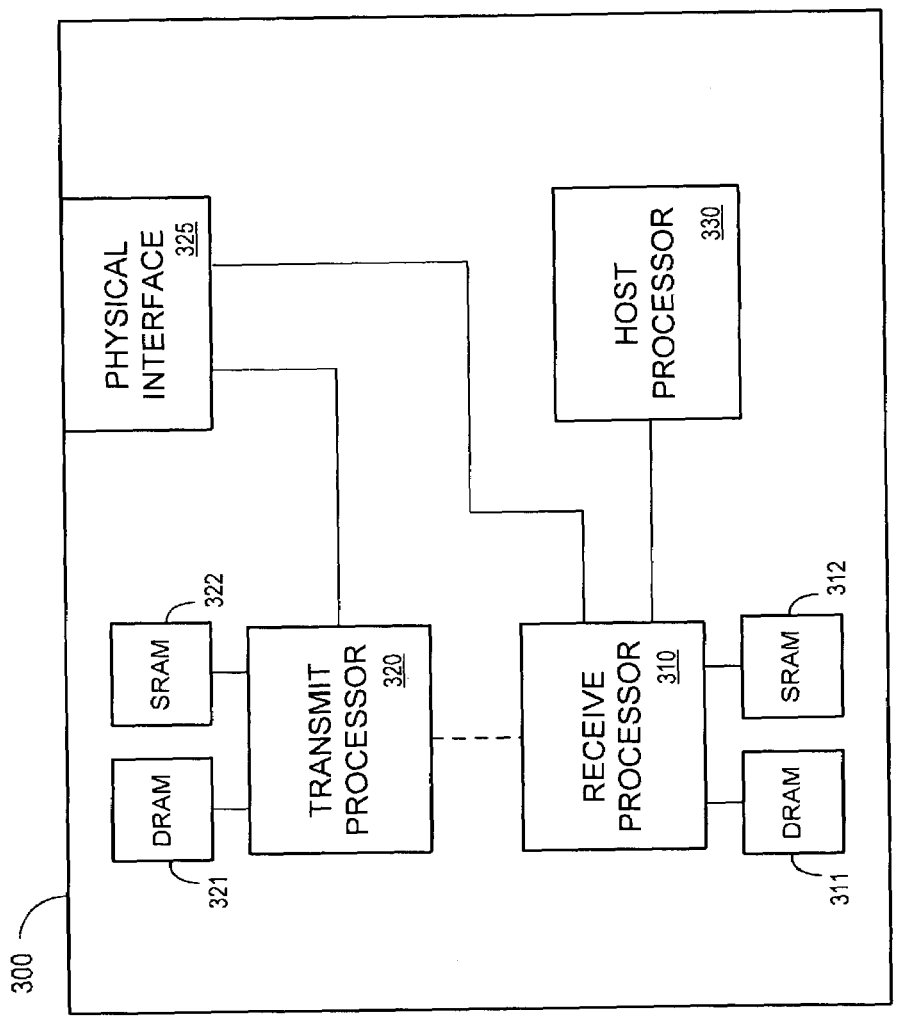
FIG. 3 is a block diagram of a network board according to some embodiments.

FIG. 3 is a block diagram of a network board according to some embodiments. Network board 300 may be an element of network device 120 of FIG. 1. Network board 300 includes transmit processor 310 and receive processor 320. One or both of transmit processor 310 and receive processor 320 may be implemented by network processor 200 of FIG. 2.

Receive processor 310 communicates with physical interface 325 via MSF 270 in order to receive network packets from a remote network device. Receive processor 310 may process the packets using DRAM 311 and SRAM 312. DRAM 311 and SRAM 312 may comprise any type of DRAM and SRAM, respectively, including Double Data Rate, Single Data Rate and Quad Data Rate memories. In some embodiments, m-packets representing the received network packets are stored in DRAM 311 during processing, while metadata associated with the packets is stored in SRAM 312. Similarly, transmit processor 320 may transmit network packets to a remote network device using physical interface 325, which is coupled to MSF 270 of processor 320. Prior to transmission, the packets may be processed using DRAM 321 and SRAM 322.

Host processor 430 is coupled to receive processor 410. Host processor 430 may control the general operation of network board 400.

Figure 4:
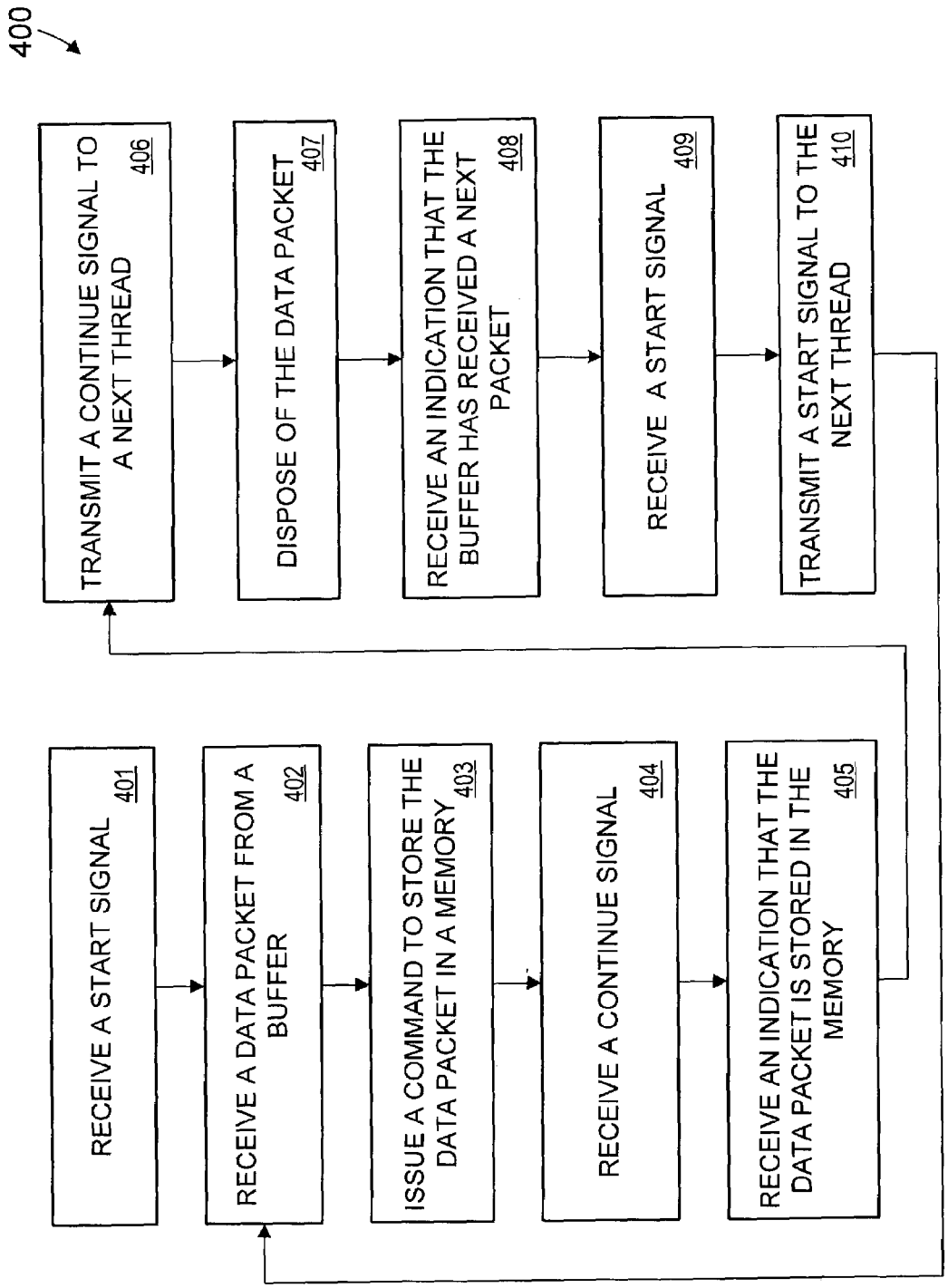
FIG. 4 is a flow diagram of a process according to some embodiments.

FIG. 4 is a flow diagram of process 400 that may be executed by network device 120 after receipt of a network packet. More particularly, process 400 may be executed by each of a plurality of threads of one or more of microengines 210 through 217 of network processor 200. Process 400 may be embodied in program code stored in one of control stores 220 through 227. The program code may be received by a control store from any medium, such as a hard disk, an IC-based memory, a signal, a network connection, or the like. In this regard, the program code may be included in a Software Developers' Kit associated with network processor 200.

Figure 5:
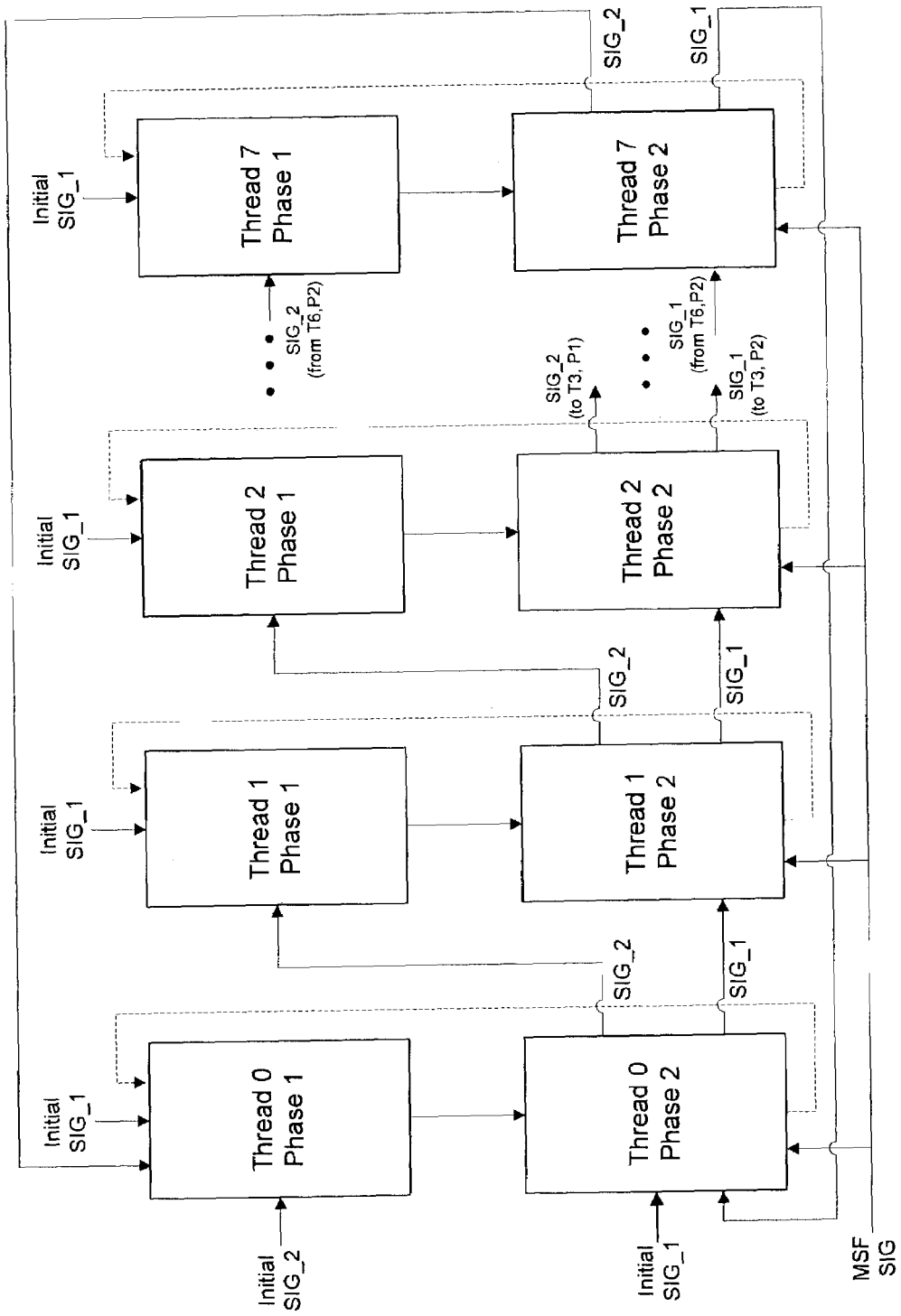
FIG. 5 is a functional block diagram illustrating the operation of threads and event signals to process packets according to some embodiments.

FIG. 5 illustrates a plurality of execution threads for the purpose of explaining some implementations of process 400. Although only four are shown, FIG. 5 represents an embodiment using eight execution threads 0 through 7. FIG. 5 also illustrates some signals transmitted and received by the threads. Generally, a thread receives an m-packet from the receive buffer of MSF 270 during phase 1 and either discards the packet or forwards the packet to a next processing block during phase 2. The present example will initially describe execution of process 400 by thread 0.

Thread 0 receives a start signal in 401. During an initial execution of process 400, the start signal may be simulated by the program code executed by the thread. This simulated signal is illustrated as Initial SIG_1 in FIG. 5. Next, thread 0 receives a data packet from an element of receive buffer of MSF 270 in 402. The element may be associated with thread 0, such that thread 0 receives an indication whenever a new packet is stored in the element. The data packet may be an m-packet that includes an SOP, SOP/EOP, MOP or EOP designation.

Receipt of the data packet in 402 may comprise receiving information associated with the data packet rather than receiving the entire data packet. In this regard, MSF 270 includes a Receiving Status Word (RSW) register that may store information associated with the packet. The RSW register may indicate whether the packet is an SOP, SOP/EOP, MOP or EOP packet, a length of the packet, a port number associated with the packet, etc.

Thread 0 issues a command in 403 to store the data packet in DRAM 311 depending on the packet designation. Since no packet has been previously received in the present example, the m-packet is stored if it is an SOP or an SOP/EOP m-packet.

Thread 0 receives a continue signal in 404. The continue signal is initially simulated by the program code and is indicated as Initial SIG_2 in FIG. 5. Thread 0 then receives an indication that the data packet has been stored in DRAM 311. According to some embodiments, thread 0 enters a sleep state after 403 and prior to 405, and the indication wakes thread 0. Therefore, another thread may enter an executing state while thread 0 is in the sleep state. This parallel execution of process 400 will be further described below.

Thread 0 moves from phase 1 to phase 2 after 405. According to the present example, thread 0 is required to receive the continue signal and the indication prior to executing phase 2. Next, in 406, thread 0 transmits a continue signal to a next thread. FIG. 5 shows continue signal SIG_2 flowing from thread 0 phase 2 to thread 1 phase 1.

Thread 0 disposes of the data packet in 407. Disposal may include dropping the packet and deleting it from DRAM 311 if the packet is corrupted or if it includes an incorrect designation. Disposal may also include using the m-packet to reassemble a larger network packet and/or forwarding the reassembled packet to a next processing block. Details of disposal in various contexts and according to some embodiments will be provided below.

In 408, thread 0 may receive an indication that an element of the receive buffer has received a next m-packet. Thread 0 may free the element and enter a sleep state prior to 408, and may be awoken by the indication. Thread 0 then receives a start signal from the program code (Initial SIG_1) in 409 and transmits a start signal to the next thread in 410. The transmitted start signal is shown as SIG_1 from thread 0 phase 2 to thread 1 phase 2. Thread 0 then returns to 402 and executes as described above, except in that the continue signal and the start signal are received in 404 and 409 from thread 7 phase 2 rather than from program code.

M-packets may be processed quickly and in proper order since each of threads 0 through 7 executes process 400. For example, in some embodiments, thread 1 cannot execute phase 2 to process an m-packet until thread 0 has processed a previous m-packet. More particularly, thread 1 cannot execute phase 2 until thread 0 has transmitted the continue signal in 406 (which is received by thread 1 during its execution of 404) and until thread 0 sleeps after disposing of the previous m-packet in 407. Such an arrangement may also ensure that each thread receives new packets in proper order, since thread 0 will free its buffer element for a new m-packet during phase 2 before thread 1 executes phase 2.

The order of process 400 may differ across embodiments. In one example, the continue signal received in 404 may be received at any time during phase 1. Similarly, some embodiments allow the start signal to be received from a previous thread at any time during phase 2.

FIGS. 6a through 6h comprise a flow diagram of process 600, which roughly corresponds to one detailed embodiment of process 400. As such, process 600 may be executed by each of a plurality of threads of one or more of microengines 210 through 217 of network processor 200, and may be embodied in program code stored in one of control stores 220 through 227. The program code may also be received from any medium, including a hard disk, an IC-based memory, a signal, a network connection, and a Software Developers' Kit.

The system is initialized in 601. In some embodiments, the thread executing process 600 issues a request for a prefetch buffer from DRAM 311 and adds itself to a freelist of threads that are usable by its microengine to process data from MSF 270. The Initial SIG_1 signals and Initial SIG_2 signal of FIG. 5 may also be transmitted to appropriate threads during initialization. Initialization may also include initializing registers and variables that are associated with the executing thread in a local memory.

The thread receives data associated with the packet from MSF 270 in 602. The information may comprise the packet itself and/or information stored in the RSW register that is associated with the packet. The information may include one or more of a byte count, a port number, a packet type (SOP, MOP, EOP, SOP/EOP), and other information. The thread also determines a local memory offset to a register that will store a Receiving Context (RCX) associated with the packet.

In 603, it is determined whether the m-packet contains errors based on the information received in 602. If so, the thread determines whether the packet is a NULL packet in 604. If the packet is not a NULL packet, the thread determines a number of a receive buffer element in which the packet resides in 605. Next, in 606, the RCX associated with the packet is examined to determine a current state of the thread.

Figure 7:
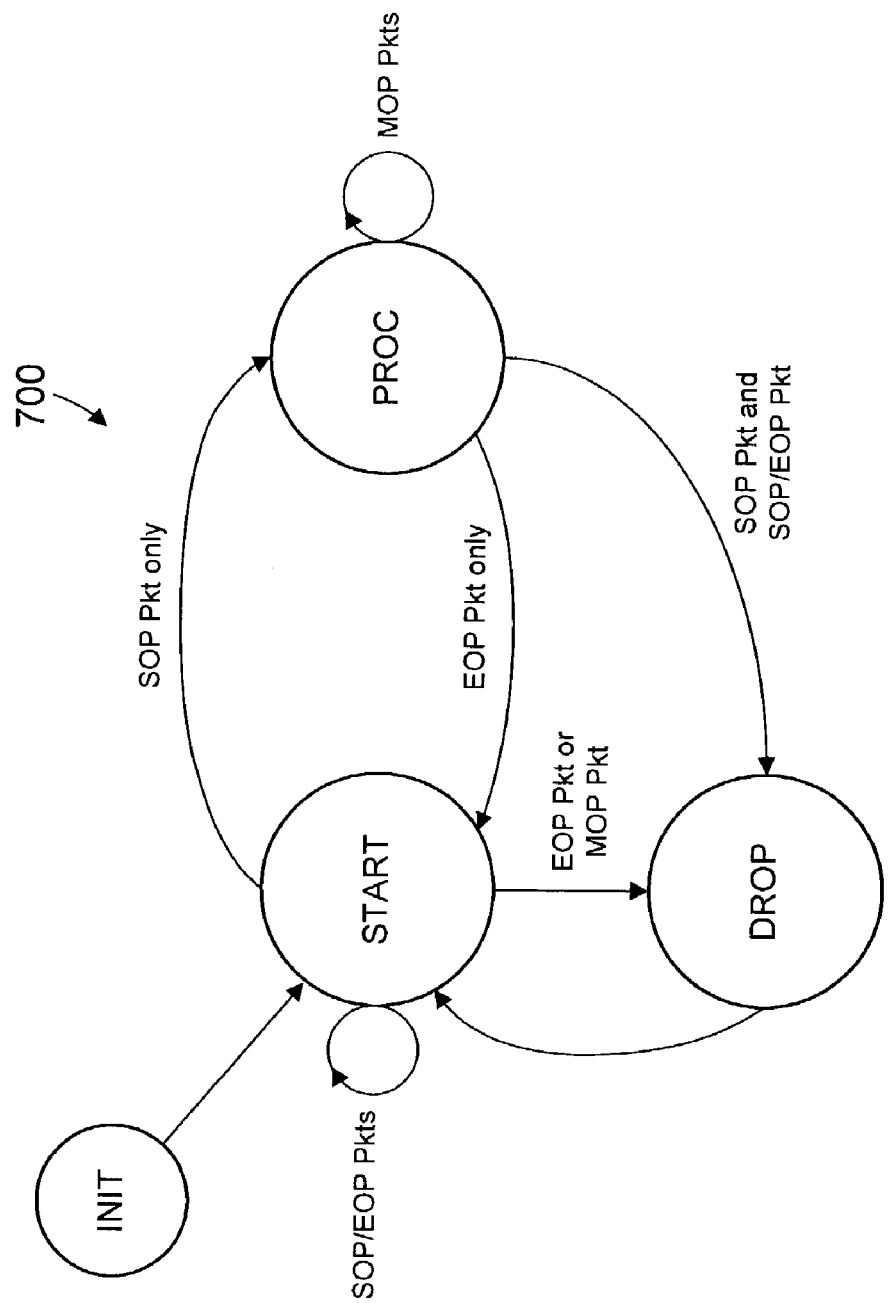
FIG. 7 is a state diagram according to some embodiments.

FIG. 7 shows state diagram 700 according to some embodiments. Process 600 is one implementation of a state machine governed by state diagram 700. More particularly, a state machine according to state diagram 700 may be embodied in microcode and implemented by a microengine thread executing the microcode.

State diagram 700 identifies an initial state INIT, a start state START, a processing state PROC and a drop state DROP. These states may be used to receive, reassemble and forward m-packets efficiently and accurately. As shown in FIG. 7, process 600 begins in the INIT state and moves between states depending on the type of m-packets that are received. In the present example, a current state of a thread is stored among RCX data associated with the thread.

Flow proceeds to 607 if the thread is not in the START state. Handles identifying the storage locations of the packet are dropped (e.g. sop handle drop_sop_handle, eop_handle drop_eop_handle) and the thread enters the sleep state until the thread receives a continue signal from a previous thread in 607. As described above, other threads may execute other portions of process 600 while the presently-described thread sleeps in 607.

The packet is dropped in 608 using the dropped handles. The receive buffer is freed and the thread returns itself to the freelist in 609. Next, in 610, the thread transmits the continue signal to a next thread and enters the sleep state. The thread wakes upon receiving a start signal from a previous thread in 611 and upon receiving an indication that the receive buffer of MSF 270 has received a next packet in 612. The indication need not be received in 612 by the executing thread. Rather, the indication may be hardware-based such that the thread sleeps until the indication is issued but is not actually made aware of the indication. The now-executing thread then transmits a start signal to a next thread on 613, and flow returns to 602 to process the next packet.

Flow proceeds to 614 if it is determined in 606 that the thread is in the START state. At 614, the thread merely waits (in the sleep state) for and receives the continue signal from the previous thread and flow continues to 609 as described above.

Returning to 604, flow continues to 615 if the packet is a NULL packet. The thread waits for and receives the continue signal from the previous thread in 615. Flow thereafter continues to 610 and proceeds as described above.

Execution arrives at 616 if the determination in 603 is negative. The system state is initially determined from the RCX in 616. The data received in 602 is then analyzed to determine a type of the received packet. According to some embodiments, the RSW register of a receive buffer element includes bits identifying whether an m-packet stored in the receive buffer is an SOP, SOP/EOP, EOP, or MOP packet. These bits may be used to determine the packet type in 616. The current state and the packet type are used to determine a next code section to execute in 616.

Figure 6A:
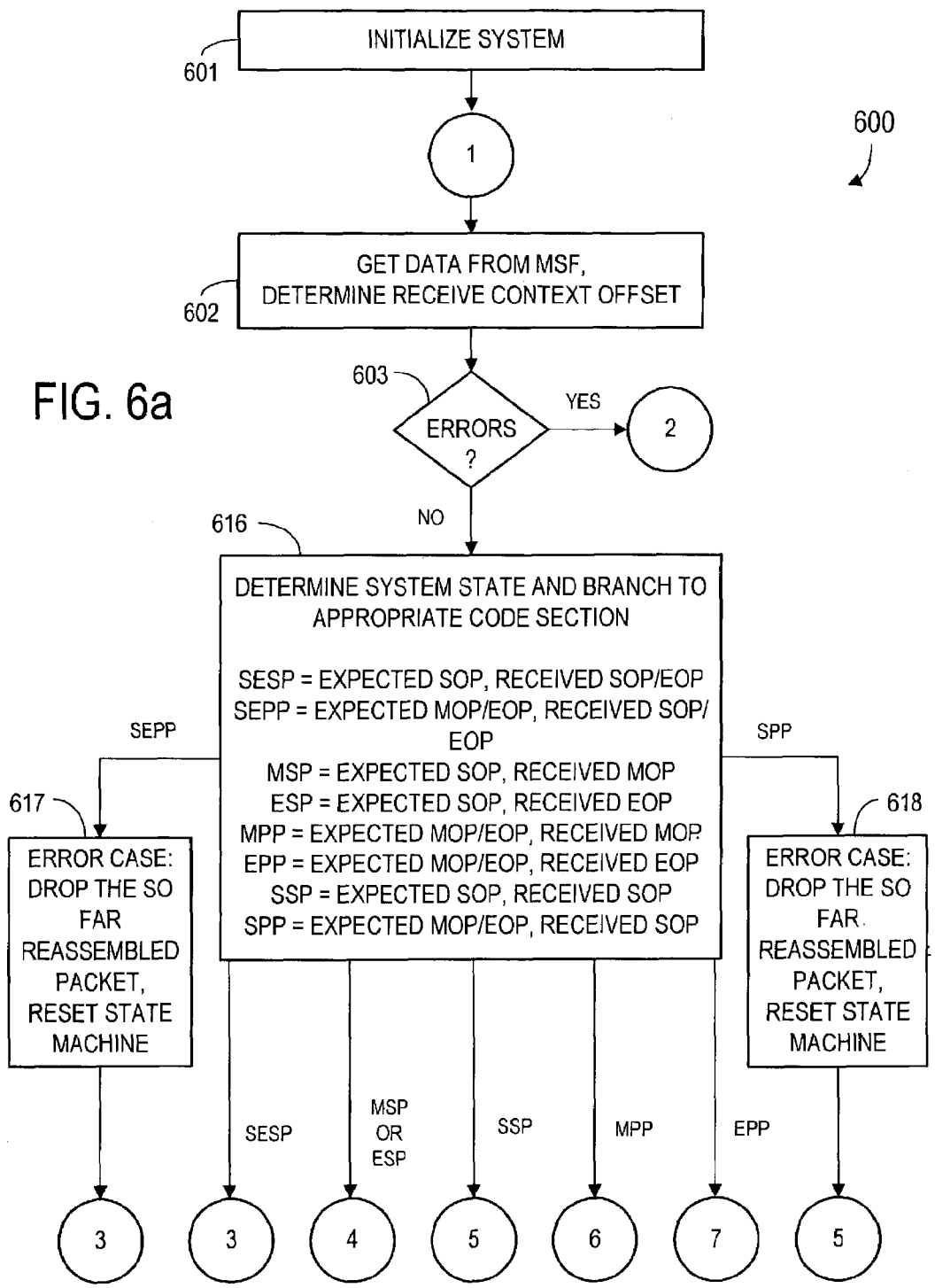
Figure 6B:
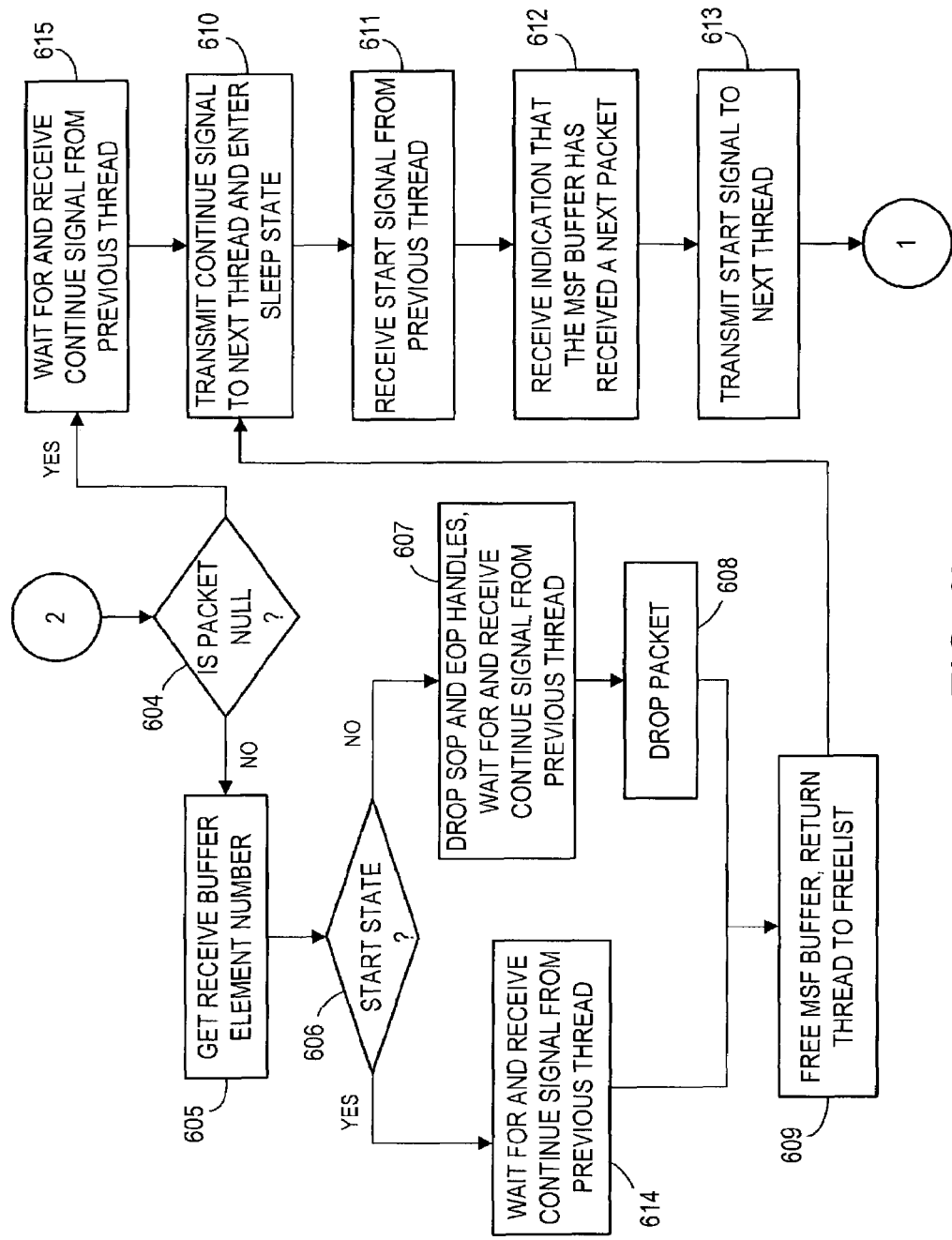
Figure 6D:
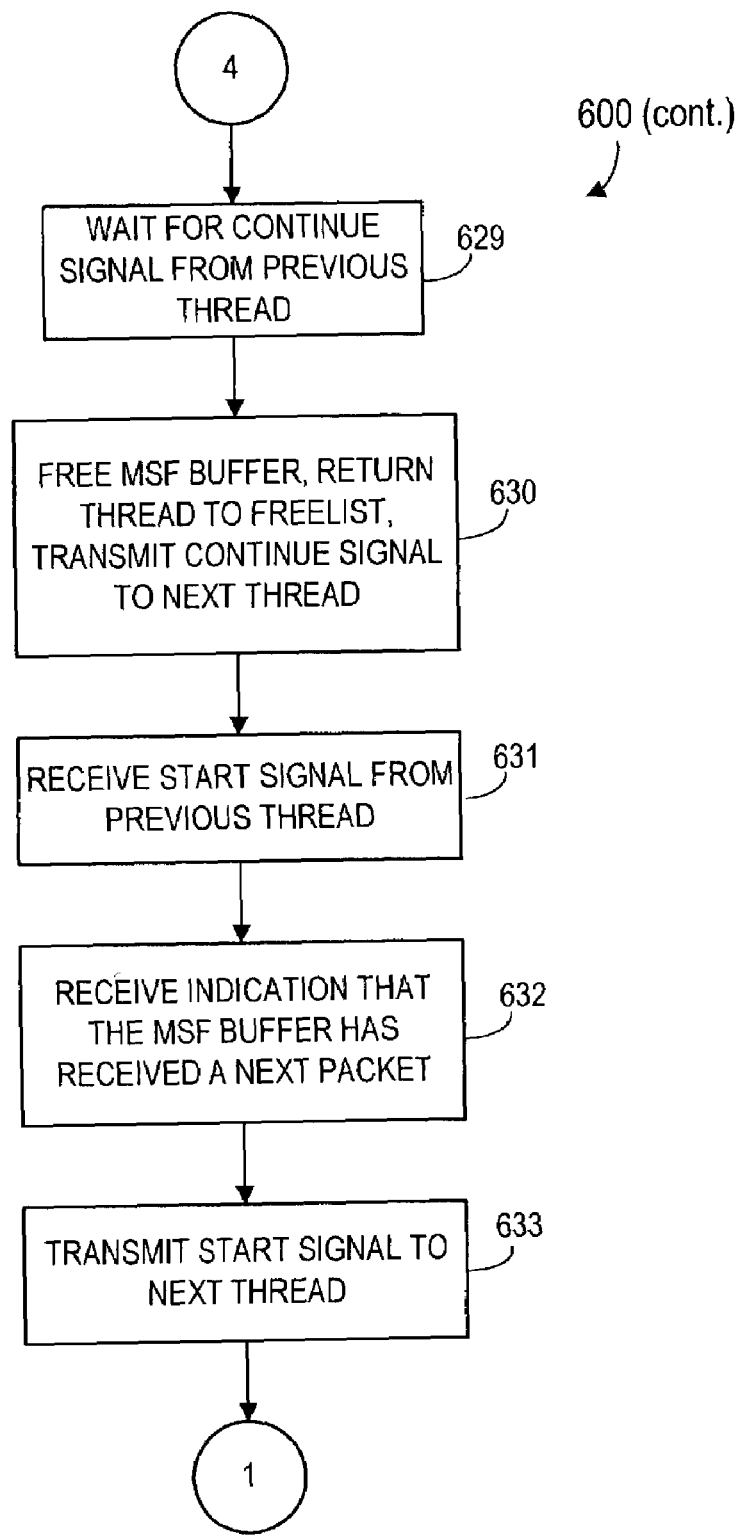
Figure 6E:
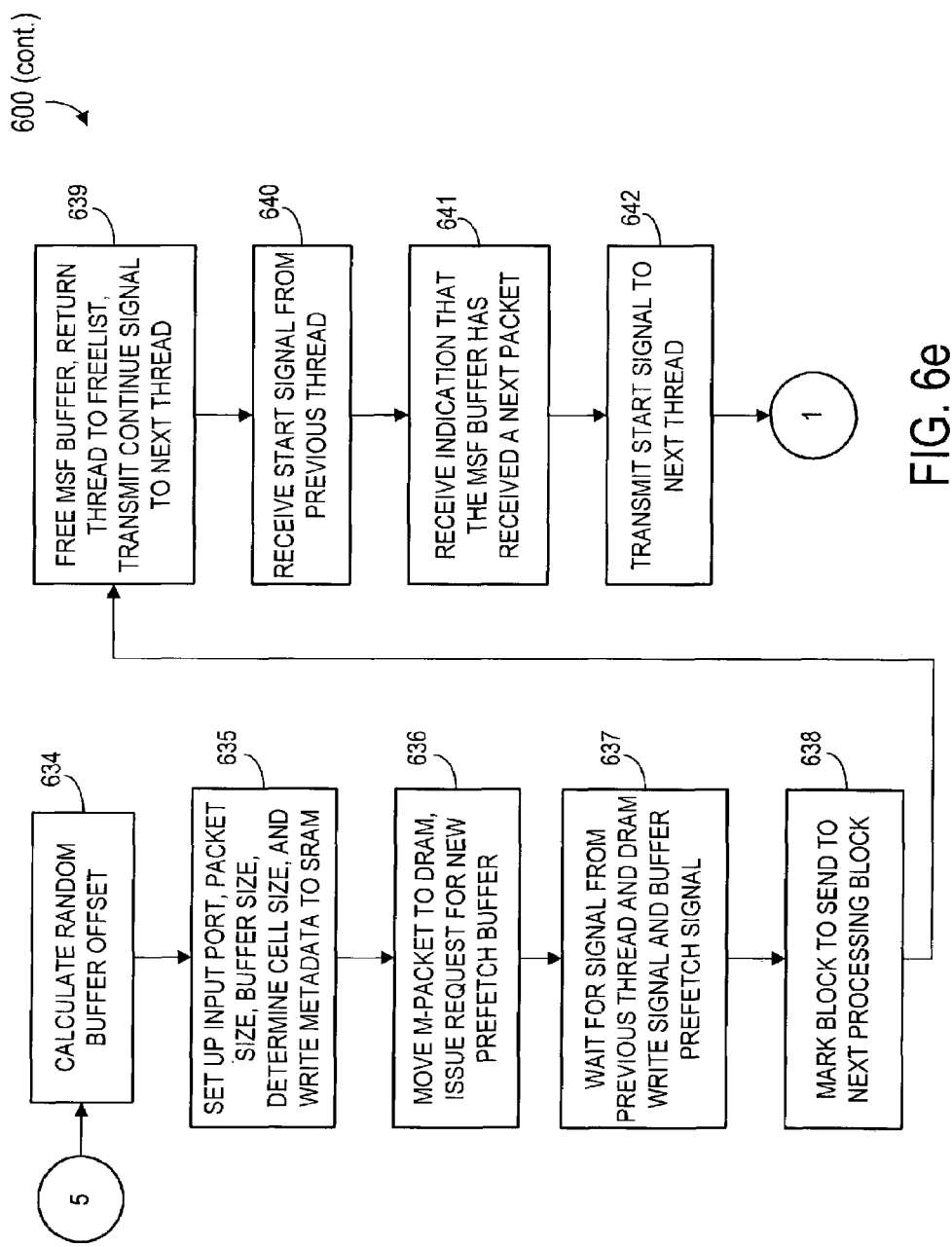

Each code section is associated with one of eight composite states (SESP, SEPP, MSP, ESP, MPP, EPP, SSP and SPP) shown in FIG. 6a. These composite states are different from the states of state diagram 700 but they are based thereon. Moreover, the code sections associated with each composite state are intended to implement state diagram 700. For example, a code section associated with composite state SESP is to be executed if the thread is in the START state (and therefore expects an SOP packet) and receives an SOP/EOP packet. Such a code section returns the thread to the START state after execution, according to state diagram 700.

In contrast, a code section associated with composite state SEPP is to be executed if the thread is in the PROC state (and therefore expects an MOP or EOP packet) and receives an SOP/EOP packet. In accordance with state diagram 700, this code section takes the thread through the DROP state and returns the thread to the START state.

For the present description, it is assumed that the thread identifies the SEPP state based on the current system state and on the received packet. The thread then accesses a jump table in the control store to locate the code section to be executed.

In this regard, the jump table may associate states such as SEPP with pointers to executable code within the control store. The code is executed to drop the m-packets that have been so far reassembled into a network packet since SEPP represents an error case. As shown in diagram 700, the state machine is then reset to the START state and the current packet is processed as if it is a complete network packet. Such processing is identical to the processing which occurs if the state determined in 616 is SESP.

Similarly, if the state determined in 616 is SPP, the thread executes code in 618 to drop the m-packets that have been so far reassembled into a network packet, and to reset the state machine to the START state. The current packet is then processed as if it is a first m-packet of a new network packet. The current packet in this case is an SOP packet, so the processing is identical to the processing which occurs if the state determined in 616 is SSP.

The executing thread calculates a random buffer offset of DRAM 311 at 619 if the composite state determined in 616 is SESP (or after 617 as described above). The random buffer offset may speed access to DRAM 311 by allowing bank scheduling. The received packet is stored in DRAM 311 at the buffer offset and a request for a new prefetch buffer is issued in 620.

The thread reads the input port and m-packet from the RSW register, computes the packet size and buffer size therefrom, and writes this information to SRAM 312 in 621. The portion of SRAM in which the information is stored corresponds to a buffer handle that also identifies the portion of DRAM 311 in which the m-packet is stored. Consequently, the buffer handle can be used to identify where an m-packet is stored and also where metadata associated with the m-packet is stored.

The thread enters the sleep state in 622 as it waits for a continue signal from a previous thread, for a DRAM write signal indicating that the packet has been successfully written to DRAM 311, and for a buffer prefetch signal issued in response to the prior request for a new prefetch buffer. The thread then wakes to mark the m-packet for processing by a next processing microblock. In this regard, the m-packet in an SOP/EOP packet and therefore comprises an entire network packet. The network packet may be subjected to layer three (e.g., IPv4) processing by the next processing microblock. The m-packet may be marked using a dl_next_block variable stored in a common microengine register.

The receiving buffer of MSF 270 is freed in 624 and the thread is returned to the freelist. Also in 624, a continue signal is transmitted to a next thread and a message is written to a scratch ring of processor 200. The message identifies the packet to other microengines of processor 200 so that the other microengines may process the packet. The thread waits in 625 for the message to be written to the scratch ring and in 626 for a start signal from a previous thread. An indication that the receive buffer has received a next m-packet is received in 627. As described above, this indication might not be received by the thread, rather hardware elements may cause execution of the thread to pause until the indication is received. A start signal is transmitted to a next thread in 628 and processing returns to 602.

Flow proceeds from 616 to 629 if the composite states MSP or ESP are determined in 616. Both the MSP and ESP composite states are error cases in which an SOP packet was expected but a non-SOP packet was received. Therefore, in 629, the thread waits to receive a continue signal from a previous thread and moves to phase 2 without storing the received packet in DRAM 311 once the continue signal is received.

During phase 2, the receiving buffer of MSF 270 is freed, the thread is returned to the freelist, and a continue signal is transmitted to a next thread. The thread then receives a start signal from a previous thread in 631. Flow continues to receive an indication in 632 that the receive buffer has received a next m-packet, and to transmit a start signal to a next thread in 633. Processing then returns to 602.

Upon returning to 616, the executing thread proceeds to 634 to calculate a random buffer offset of DRAM 311 if the composite state is SSP. SSP indicates that an SOP packet was both expected and received. As described above, the thread also proceeds to 634 after 618 if the composite state is SPP.

The thread reads the input port and m-packet size from the RSW register, computes the cell size of the network packet and the buffer size, and writes this metadata to a corresponding location of SRAM 312 in 635. The received packet is stored in DRAM 311 at the buffer offset and a request for a new prefetch buffer is issued in 636.

The thread enters the sleep state in 637 as it waits for a continue signal from a previous thread, for a DRAM write signal indicating that the packet has been successfully written to DRAM 311, and for a buffer prefetch signal issued in response to the prior request for a new prefetch buffer. The thread then wakes in 638 to mark the m-packet for processing by a next processing microblock as described above.

The receiving buffer of MSF 270 is freed in 639, the thread is returned to the freelist, and a continue signal is transmitted to a next thread. The thread pauses in 640 for a start signal from a previous thread, and in 641 for an indication that the receive buffer has received a next m-packet. The thread transmits a start signal to a next thread in 642 and processing returns to 602.

Processing continues from 616 to 643 if the thread is in the PROC state and the newly-received packet is an MOP packet. This composite state is identified as MPP in FIG. 6a. At 643, the m-packet is stored in DRAM 311 at a location that follows the location of a previously-stored m-packet of the same network packet. The receiving context associated with the network packet is updated in 644 to reflect a new buffer size and packet size based on the newly-received m-packet. Next, at 645, a cell count is determined based on the m-packet.

The thread determines if the buffer of DRAM 311 is full at 646. If not, a data pointer in the RCX is updated in 647 to reflect the storage location of a next m-packet based on a size of the current m-packet. The thread then enters the sleep state at 648 to wait for a continue signal from a previous thread and for a signal that indicates that the m-packet has been stored in DRAM 311.

If it is determined that the buffer is full in 646, a new buffer is allocated in 649. Flow continues at 650 if the current buffer is not associated with an SOP packet. Specifically, a cell count of the current buffer handle stored in the Receiving Context is updated, and metadata of the previous buffer handle is updated to point to the current buffer. The current buffer handle and size are stored in the Receiving Context as the previous buffer handle and size, and the Receiving Context is reinitialized. The thread then executes at 648 as described above.

Figure 6F:
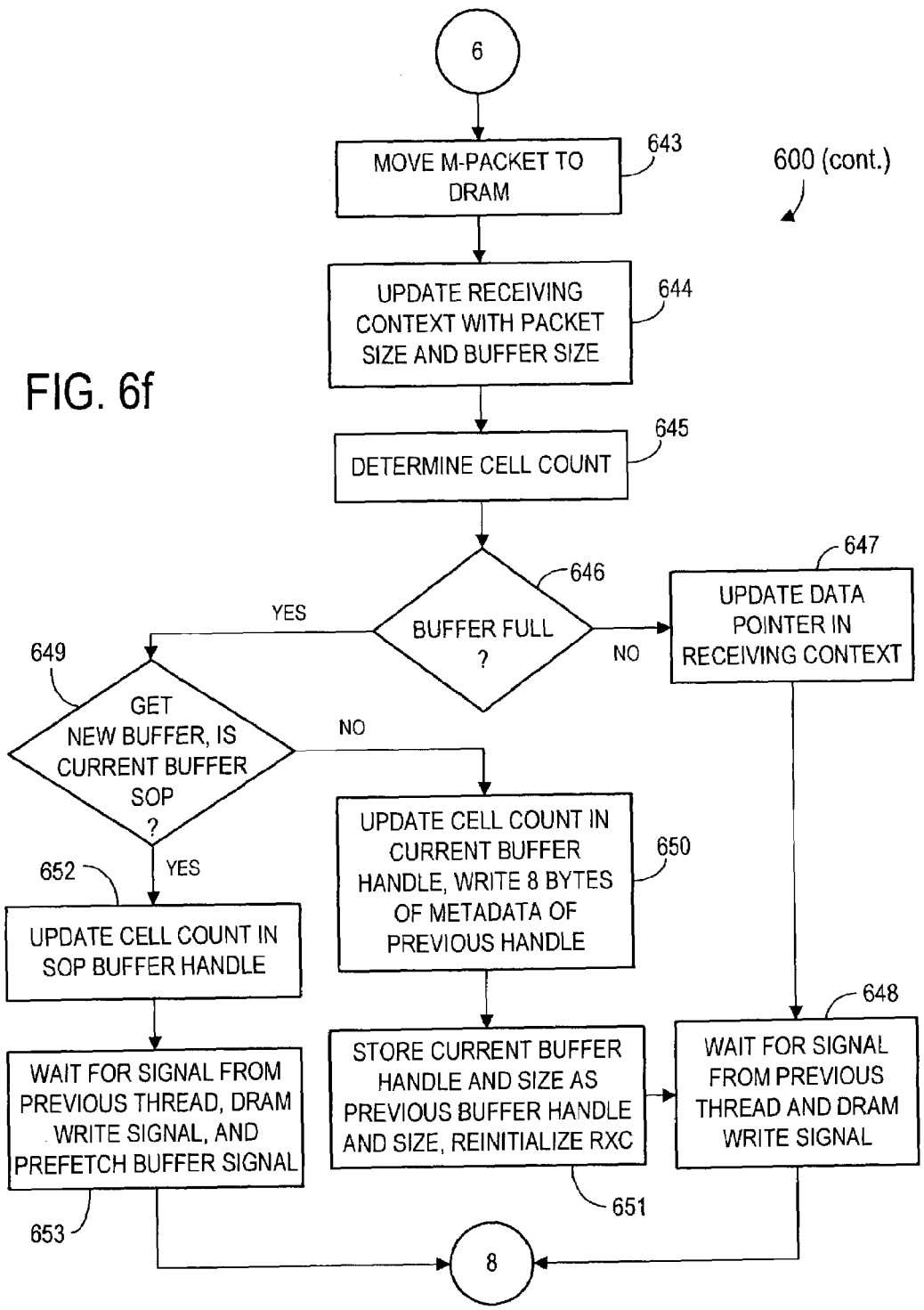
Figure 6G:
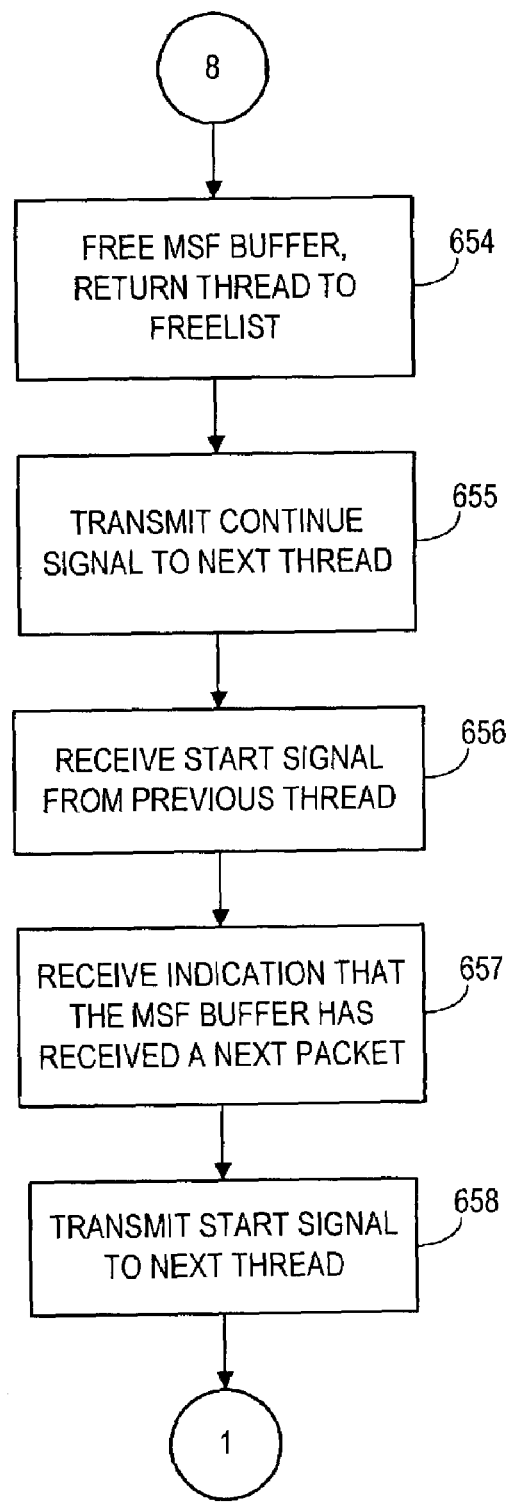
Figure 6H:
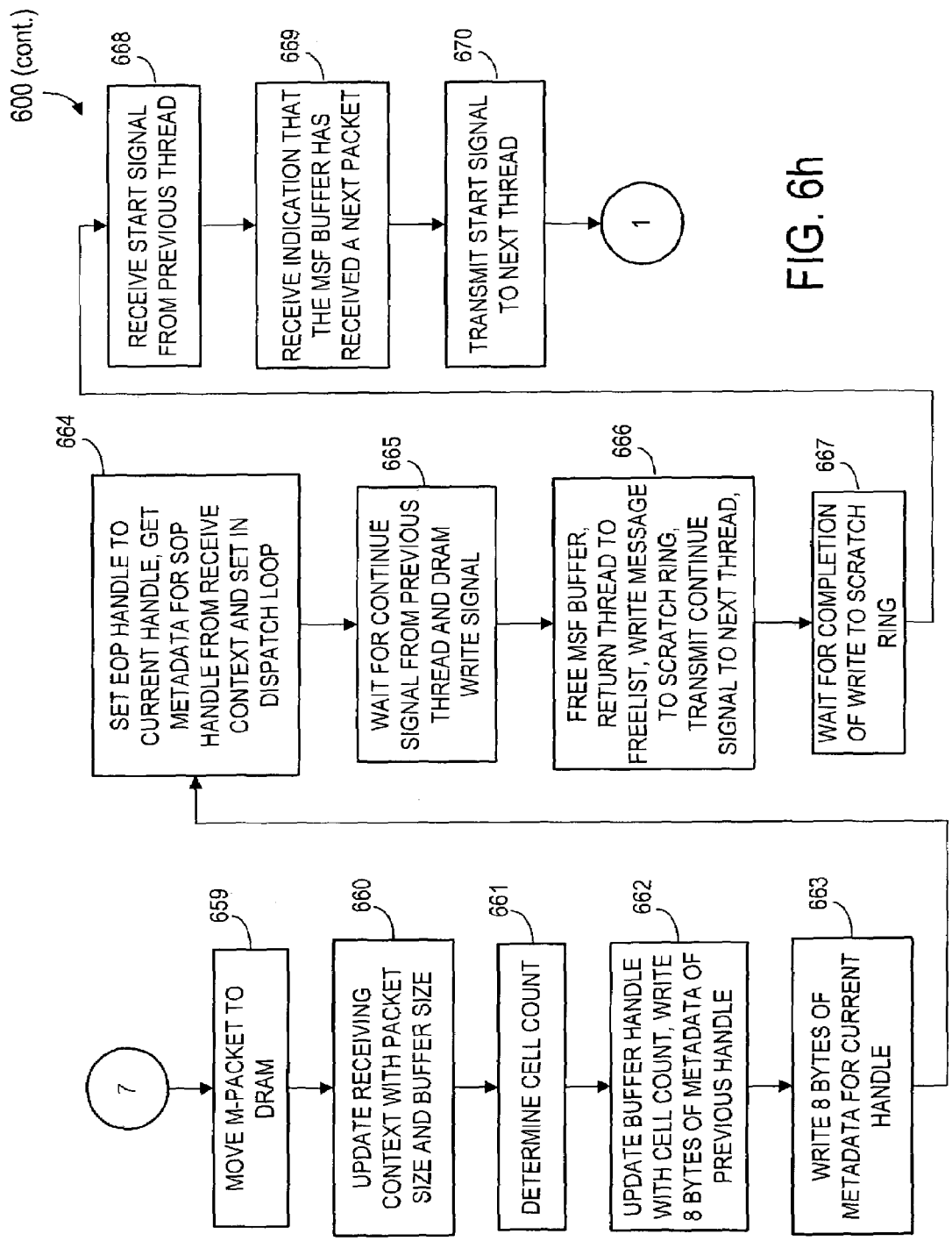

If the current buffer is associated with a SOP packet in 649, the cell count in the SOP buffer handle is updated in 652. Next, in 653, the thread waits for a continue signal from a previous thread, for an indication that the packet has been written to DRAM 311, and for a prefetch buffer signal. As shown in FIG. 6f, flow continues from 653 and 648 to 654.

The receive buffer of MSF 270 is freed and the thread returns itself to the freelist at 654. The thread transmits a continue signal to a next thread in 655 and waits to receive a start signal from a previous thread in 656. After receiving an indication in 657 that the receive buffer has received a new packet, the thread transmits a start signal to a next thread and flow returns to 602.

At 616, a composite state of EPP is determined if an MOP or EOP packet was expected and an EOP packet was received. This composite state represents a change of state from the PROC state to the START state of state diagram 700. More particularly, The EPP composite state indicates that a last m-packet of a network packet has been received. A process associated with the EPP composite state begins at 659.

The newly-received EOP packet is stored in DRAM 311 at 659. The receiving context associated with the network packet is then updated in 660 to reflect a new buffer size and packet size based on the newly-received packet. A cell count is then determined at 661 based on the m-packet.

The determined cell count is used to update the current buffer handle stored in the Receiving Context, and metadata of the previous buffer handle is updated to point to the current buffer at 662. Eight bytes of metadata are written to the current handle in 663, and the EOP handle is set to the current handle in 664. Metadata associated with the SOP handle is received from the Receive Context and set in a dispatch loop of processor 200. Setting the handle in the dispatch loop allows other microengines of processor 200 to locate the network packet in DRAM 311 and metadata associated with the network packet in SRAM 312.

The thread then waits for a continue signal from a previous thread and for an indication that the packet has been written to DRAM 311 in 665. Next, the receive buffer of MSF 270 is freed and the thread returns itself to the freelist at 666. Also in 666, a continue signal is transmitted to a next thread and a message identifying the packet is written to the scratch ring of processor 200. The thread waits at 667 for the message to be written to the scratch ring and in 668 for a start signal from a previous thread. After receiving an indication in 669 that the receive buffer of MSF 270 has received a new packet, the thread transmits a start signal to a next thread in 670 and flow returns to 602.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method comprising:
   invoking a plurality of threads of execution, each of the threads of execution:
   receiving a start signal from a previous thread;
   receiving a data packet from a buffer;
   issuing a command to store the data packet in a memory;
   receiving a continue signal from the previous thread;
   transmitting a continue signal to a next thread after the data packet is stored in the memory;
   disposing of the data packet;
   receiving an indication that the buffer has received a new packet;
   receiving a start signal from the previous thread; and
   transmitting a start signal to a next thread.

2. A method according to claim 1, further comprising:
   entering a sleep state after issuing the command; and
   waking from the sleep state after the data packet is stored in the memory, wherein another one of the plurality of threads is active during the sleep state.

3. A method according to claim 1, further comprising:
   releasing the buffer;
   entering a sleep state after releasing the buffer; and waking from the sleep state in response to the indication.

4. A method according to claim 1, wherein disposing of the packet comprises:
   forwarding the data packet to a next processing block if the data packet is not received in error; and
   discarding the data packet if the data packet is received in error.

5. A method according to claim 1, further comprising:
   receiving an initialization start signal.

6. A method according to claim 1, further comprising:
   determining a state based on the received data packet; and
   executing a process based on the determined state.

7. A method according to claim 6, further comprising:
   accessing a jump table to determine the process based on the determined state.

8. A method according to claim 7, wherein the jump table comprises associations between states and pointers to executable code.

9. A method according to claim 1, wherein the previous thread is one of the plurality of threads of execution.

10. method according to claim 1, wherein the next thread is one of the plurality of threads of execution.

11. A method according to claim 1, wherein the previous thread is one of the plurality of threads of execution, and wherein the next thread is one of the plurality of threads of execution.

12. An apparatus comprising:
    memory storing program code, the program code executable to:
    invoke a plurality of threads of execution, each of the threads of execution to:
    receive a start signal from a previous thread;
    receive a data packet from a buffer;
    issue a command to store the data packet in a memory;
    receive a continue signal from the previous thread;
    transmit a continue signal to a next thread after the data packet is stored in the memory;
    dispose of the data packet;
    receive an indication that the buffer has received a new packet;
    receive a start signal from the previous thread; and
    transmit a start signal to a next thread.

13. An apparatus according to claim 12, the program code further executable to:
    entering a sleep state after issuing the command; and
    waking from the sleep state after the data packet is stored in the memory,
    wherein another one of the plurality of threads is active during the sleep state.

14. An apparatus according to claim 12, the program code further executable to:
    release the buffer;
    enter a sleep state after releasing the buffer; and
    wake from the sleep state in response to the indication.

15. An apparatus according to claim 12, wherein the program code executable to dispose of the packet comprises program code executable to:
    forward the data packet to a next processing block if the data packet is not received in error; and
    discard the data packet if the data packet is received in error.

16. An apparatus according to claim 12, the program code further executable to:
  receive an initialization start signal.

17. An apparatus according to claim 12, the program code further executable to:
  determine a state based on the received data packet; and
  execute a process based on the determined state.

18. An apparatus according to claim 17, the program code further executable to:
  access a jump table to determine the process based on the determined state.

19. An apparatus according to claim 18, wherein the jump table comprises associations between states and pointers to executable code.

20. An apparatus comprising:
  a processor;
  a Double Data Rate random access memory coupled to the processor; and
  a control store associated with the processor, the control store storing program code executable by the processor to:
    invoke a plurality of threads of execution, each of the threads of execution to:
      receive a start signal from a previous thread;
      receive a data packet from a buffer;
      issue a command to store the data packet in the random access memory;
      receive a continue signal from the previous thread;
      transmit a continue signal to a next thread after the data packet is stored in the random access memory;
      dispose of the data packet;
      receive an indication that the buffer has received a new packet;
      receive a start signal from the previous thread; and
      transmit a start signal to a next thread.

21. An apparatus according to claim 20, each of the threads of execution further to:
  enter a sleep state after issuing the command; and
  wake from the sleep state after the data packet is stored in the memory,
  wherein another one of the plurality of threads is active during the sleep state.

22. An apparatus according to claim 20, each of the threads of execution further to:
  release the buffer;
  enter a sleep state after releasing the buffer; and
  wake from the sleep state in response to the indication.

23. A system comprising:
  a plurality of network devices; and
  a switch to receive packets from one or more of the plurality of network devices, wherein the switch comprises:
    a memory storing processor-executable program code; and
    a processor in communication with the memory and operative in conjunction with the stored program code to:
      invoke a plurality of threads of execution, each of the threads of execution
    to:
      receive a start signal from a previous thread;
      receive a data packet from a buffer;
      issue a command to store the data packet in a memory;
      receive a continue signal from the previous thread;
      transmit a continue signal to a next thread after the data packet is stored in the memory;
      dispose of the data packet;
      receive an indication that the buffer has received a new packet;
      receive a start signal from the previous thread; and
      transmit a start signal to a next thread.

24. A system according to claim 23, each of the threads of execution further to:
  enter a sleep state after issuing the command; and
  wake from the sleep state after the data packet is stored in the memory,
  wherein another one of the plurality of threads is active during the sleep state.

25. A system according to claim 23, each of the threads of execution further to:
  release the buffer;
  enter a sleep state after releasing the buffer; and
  wake from the sleep state in response to the indication.

* * * * *